Jan. 24, 1956 S. V. COLLINS 2,731,800
METHOD OF LAYING AND RETRIEVING UNDERWATER PIPE LINE
Original Filed July 13, 1950 4 Sheets-Sheet 2
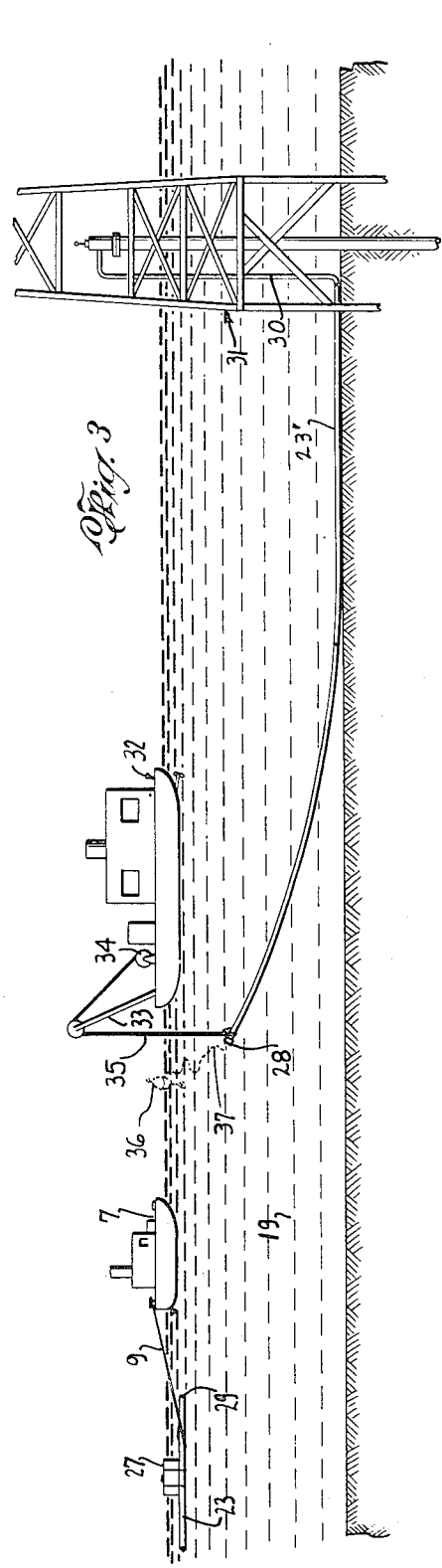
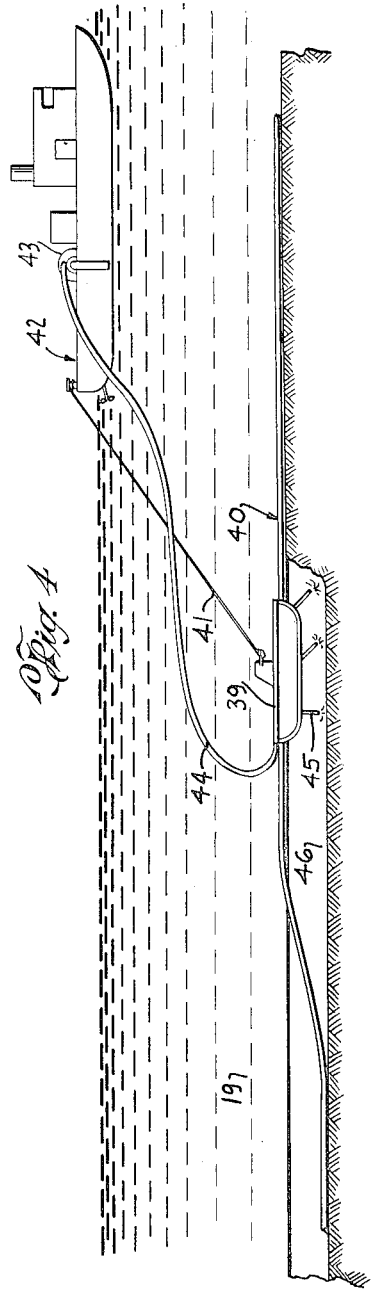
S. V. Collins
INVENTOR.
BY G. C. Helmig
ATTORNEYS

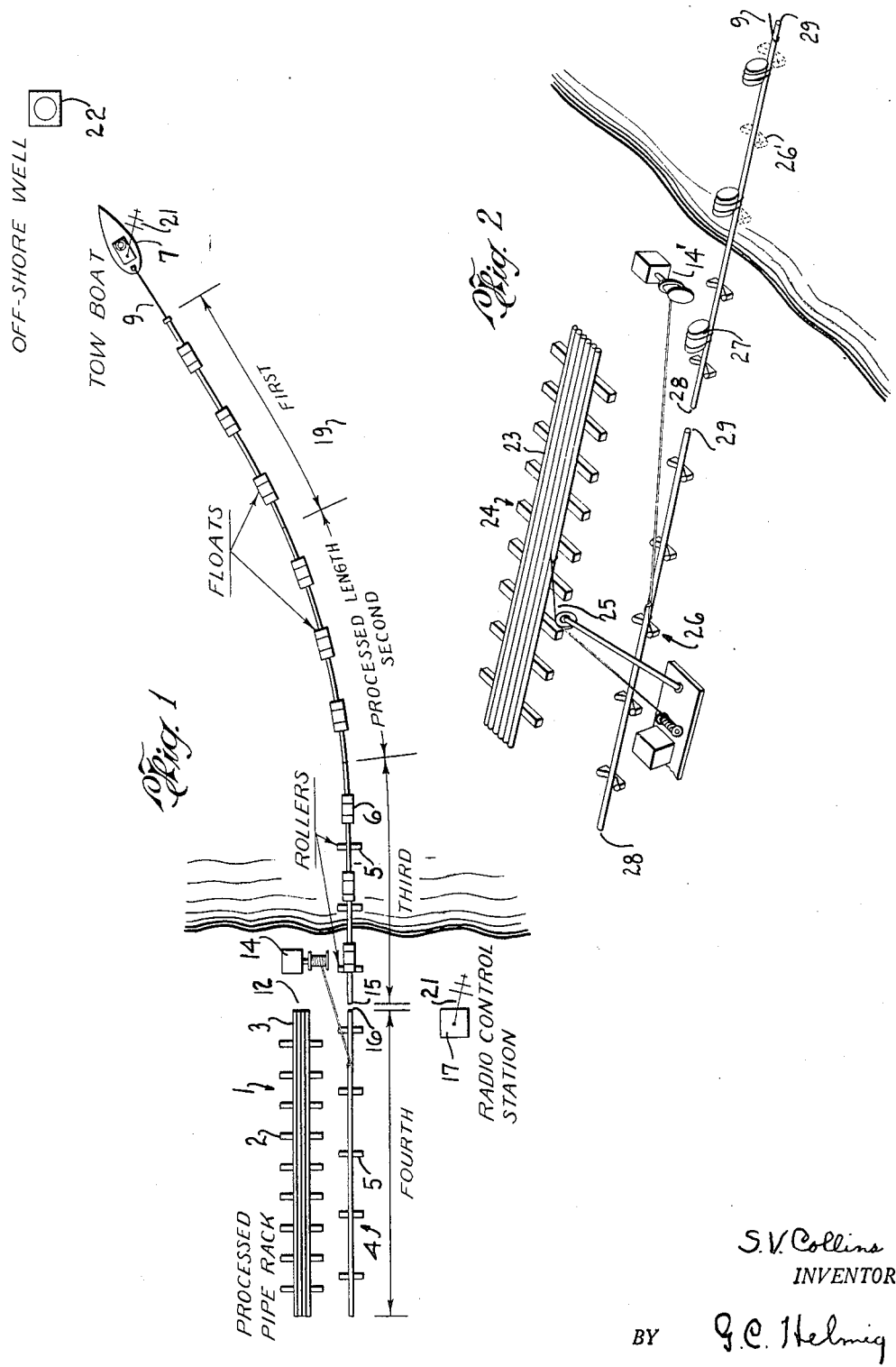

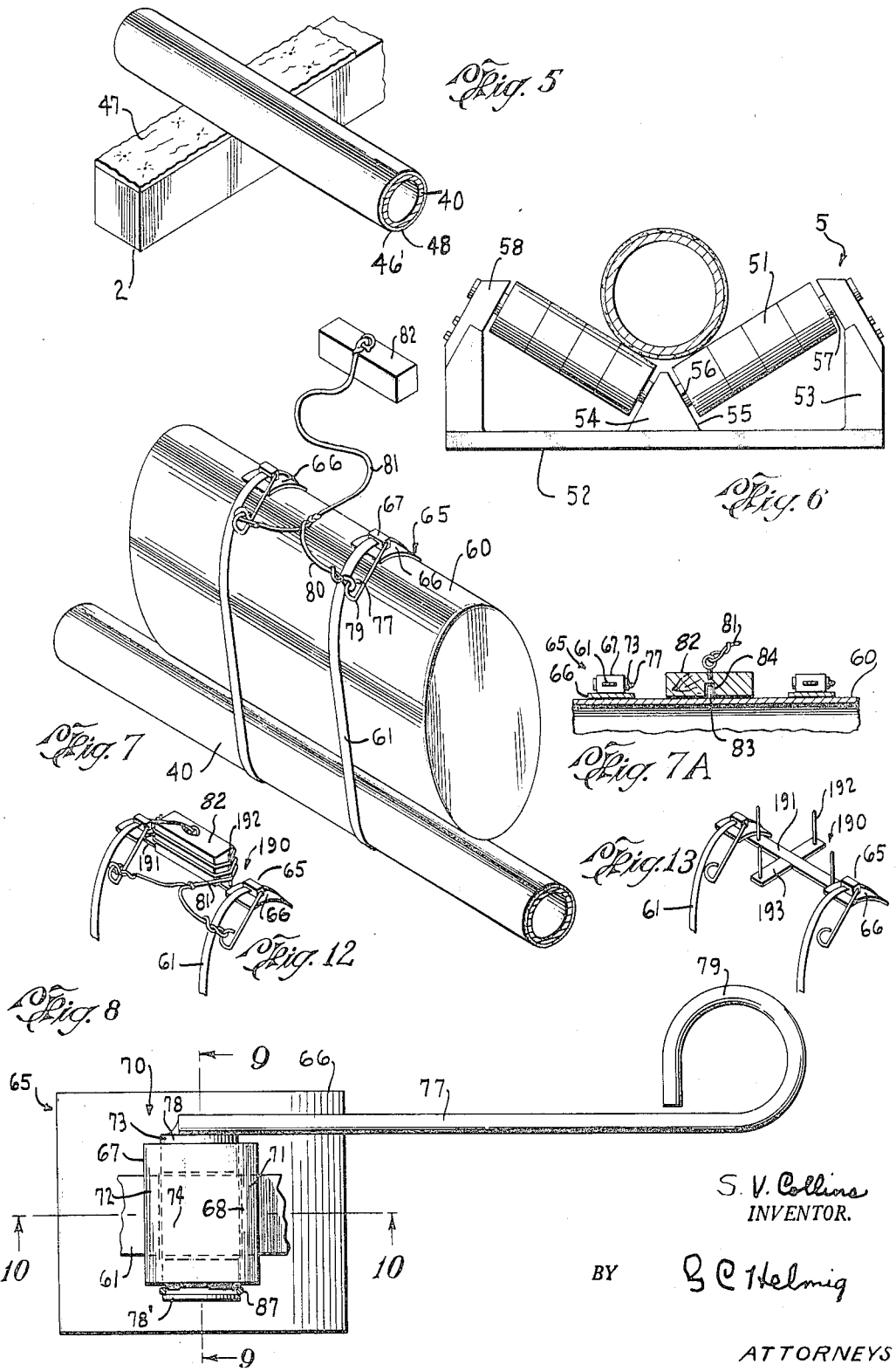

Jan. 24, 1956  S. V. COLLINS  2,731,800
METHOD OF LAYING AND RETRIEVING UNDERWATER PIPE LINE
Original Filed July 13, 1950  4 Sheets-Sheet 4

S. V. Collins
INVENTOR.

BY G. C. Helmig

ATTORNEYS

United States Patent Office 2,731,800
Patented Jan. 24, 1956

2,731,800

METHOD OF LAYING AND RETRIEVING UNDERWATER PIPE LINE

Samuel V. Collins, Port Lavaca, Tex.

Original application July 13, 1950, Serial No. 173,623. Divided and this application August 7, 1951, Serial No. 240,762

8 Claims. (Cl. 61—72)

This invention relates to a method of extending a pipe line to an off-shore location, as an oil well, and to extending such a pipe line across a body of water. It also relates to apparatus devices, and equipment which may be employed for accomplishing such extension. This application is a divisional application of parent application Serial No. 173,623, filed July 13, 1950, which has since matured into Patent No. 2,602,300 dated July 8, 1952, now Reissue No. 23,963, dated March 15, 1955.

It is an object of this invention to provide a novel method and inexpensive apparatus for quickly extending a pipe line from shore to a location upon, or across a body of water.

It is another object of this invention to provide a method and apparatus for thus extending a coated pipe line without injuring the coated surface thereof, and without admitting water inside the pipe line.

It is a further object of this invention to provide a method and apparatus for extending a pipe line from the shore to a near-by location or across a short expanse of water by adding sections of pipe to the line on the shore adjacent the launchway.

It is another object of this invention to provide a method and apparatus for extending a pipe line out to a remote location upon a body of water, or across a wide expanse of water, by towing floated pipe sections to sea and shore connecting such sections to the completed portion of the line.

It is a further object of this invention to provide a launchway for launching coated sections of pipe; such a launchway comprising a plurality of portable roller units which may be easily moved from one launching point to another.

It is a further object of this invention to provide a novel method of floating pipe sections at sea and also to provide the equipment therefor which may be easily disconnected from the line upon the water and recovered.

It is also an object of this invention to provide apparatus for, and methods of recovering pipe lines from under water by employing substantially the equipment employed to lay the line in substantially the reverse order to retrieve the line.

It is a further object of this invention to provide a launchway which extends substantially perpendicular to the shoreline at its point of contact therewith, and which has a series of padded, floatable dollies, either slidable or adapted to roll upon said launchway, so that process coated pipe may be launched and the dollies recovered from the water.

Other and further objects of this invention will be apparent when the specification will be considered in connection with the drawings in which:

Fig. 1 is a diagrammatic plan view showing the method of extending a pipe line from shore to a near-by location as an off-shore well;

Fig. 2 is a perspective view showing a step in the launching of pipe sections which are to be floated to sea and welded at sea to the completed portion of the pipe line;

Fig. 3 shows the step following that shown in Fig. 2; in this figure the section being towed is shown approaching the completed portion of the line while the completed portion of the line is being raised so that the towed sections may be connected thereto;

Fig. 4 shows the operation of entrenching a sunken pipe line into the ocean floor;

Fig. 5 is a perspective view showing the coated character of the pipe sections employed in pipe lines and this view also shows the necessity for padding supports, such as launchways, to protect the coated pipe;

Fig. 6 is an elevation of a roller unit employed in one type of launchway;

Fig. 7 is a perspective view showing a float connected to a pipe section;

Fig. 7A is a fragmentary sectional elevation showing one means of maintaining the band clipper float block on a float barrel until the float block is in contact with the water.

Fig. 8 is a plan view of a band clipper employed on floats to sever the bands connecting them to the pipe line when it is desired to sink the pipe line to the ocean floor;

Fig. 12 is a perspective view, with barrel omitted, showing another modification of a means for maintaining the band clipper float block on the float barrel;

Fig. 13 is a perspective view showing a modification of the means shown in Fig. 12.

Figure 11:
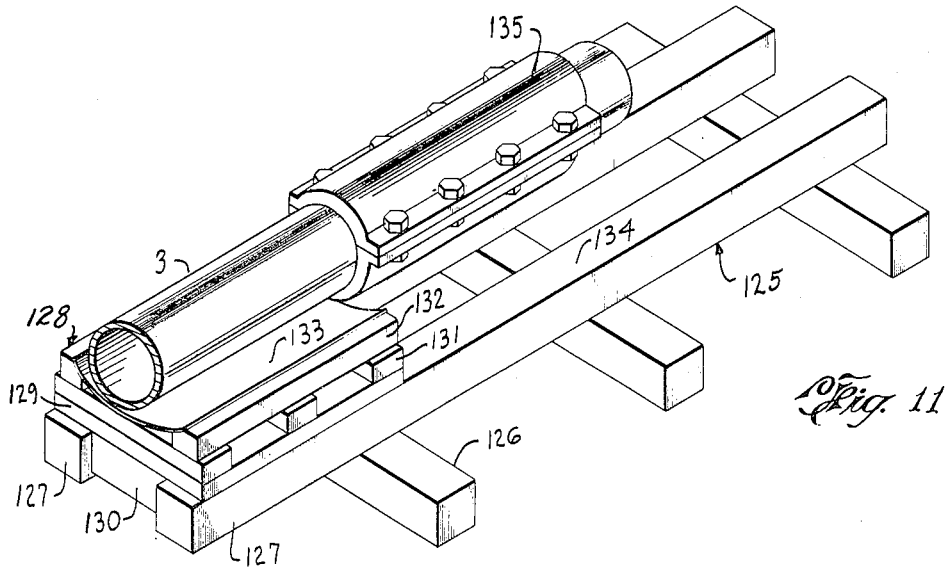
Fig. 11 is a perspective view showing a portion of one modification of launchway.

In conventional methods of launching pipe heretofore employed, the pipe has usually been launched sideways, requiring that a pier be found, or a substantially long, straight stretch of shore line on which a sidewise launchway may be built. Also, great difficulty has been experienced in floating pipe sections at sea, and usually a multiplicity of tow boats or tugs have been required. In cases where float means have been connected to pipe sections, great difficulty has also been encountered in disconnecting the float means when it has been desired to sink the pipe, and additional difficulties and losses have resulted in endeavoring to recover the float means. Further difficulties have also arisen when it has been endeavored to sink the pipe into the ocean floor when awkward dredging equipment has been employed to form the trench into which the pipe is to be placed. The system of equipment covered by this invention, and the methods employed, set out to remedy these enumerated difficulties and other obvious ones inherent to the art of extending pipe lines over bodies of water to be entrenched into the floor therebelow.

As shown in Fig. 1, a pipe rack 1 is provided comprising spaced apart support members 2 forming a line preferably perpendicular to the shore. Sections of processed pipe 3 may then be assembled upon, or brought to the pipe rack. Adjacent the pipe rack 1, and extending parallel thereto, the launchway 4 is provided. As shown, this launchway comprises spaced apart rollers 5 to be hereinafter described. A pipe section 3 is then moved from rack 1 to launchway 4 and float means 6 are connected thereto at spaced apart intervals. The seaward end 16 of the section is then plugged.

The pipe section 3, with floats attached, is then moved axially seaward upon the rollers 5' which extend into the water. The section is launched far enough, in this manner, to permit a towing means, as a tow boat 7, to attach a towing line 9 thereto. The tow boat then tows the section seawardly in the desired direction, until the landward end 15 of the pipe section 3 is adjacent the seaward end 12 of the racked pipe. The winch 14 is provided to handle the pipe sections 3, and such is shown being used to bring the seaward end 16 of a section on the launchway 4 into abutment with the seaward end 15 of the preceding launched section.

To control the movement of the pipe by the tow boat 7, vocal control is first used from the control station 17 ashore, so that the pipe end 16 and pipe end 15 may be kept adjacent each other for alignment, abutment, and welding. It is thus apparent that the director on shore must closely observe the ends 15 and 16 and that he must communicate timely with the tow boat operator who responds promptly to stop the tow boat.

When the ends have been abutted and welded, and the coating replaced and completed about the welded joint, the tow boat is then ready to proceed to tow the pipe line seawardly until the end 15 of the section just added is adjacent the end 12 of the rack 1.

When this process has continued until the tow boat 7 is out of vocal communication range, communication may then be conducted by radio, both the control station 17 ashore and the tow boat 7 being equipped with transmitting and receiving sets 21. This method of communication may then be used until the pipe line 20 is extended to location, as to the other side of the body of water 19, or to an off-shore well 22. When the pipe line has been extended to desired location, and it is desired to sink the line to the floor beneath the body of water, the float means 6 are disconnected from the line and are retrieved. The method of accomplishing this will be set forth hereinbelow.

In cases where the off-shore location, or the body of water to be traversed, comprises too great a distance for handling pipe by the above described method, the method of Figs. 2 and 3 may be employed. In this method, pipe sections 23 usually of considerably greater size and length than the sections 3, are assembled or positioned on the rack 24, and are handled therefrom by the cat line 25 onto the launchway 26. When float means 27 are connected to the pipe sections and both the inboard end 28 and outboard end 29 is plugged, and the section is launched down the launchway extension 26' until a towing line 9 from the tow boat 7 may be connected to the outboard end 29. The winch 14' is provided for handling the pipe in launching.

The tow boat 7 then tows the floated pipe sections to sea, the first section 23' being connected by conventional means and methods to a location, as to the riser 30 of the off-shore well 31. Subsequent sections are added by the method shown in Fig. 3 whereby a craft 32 equipped with a boom 33, winch 34, and handling line 35 as shown, is employed to lift the end 28 of a pipe section, to be aligned with the end 29 of the approaching section 23, towed by the tow boat 7, so that the ends, after being unplugged, may be welded together and the uncoated surface about the welded joint coated while held out of the water 19.

After this occurs the float means 27 are detached from the newly added section so that it may sink into the water. The float means are then recovered for further use as will be hereinafter described.

In every case where it is desired to release the craft 32 from its purchase on the pipe line, a buoy or marker 36 is connected to the end 28 of the added section, by a line 37 of greater length than the depth of water at that point. Thus the floating marker indicates to the crew of the craft 32 the next point at which they are to connect to the pipe line end to be raised.

After a pipe line has been completed by either of the methods hereinabove described, it is desirable to sink the pipe into the earth floor beneath the body of water 19. This is accomplished by installing a trenching machine 39 around the pipe line 40 to be towed by the line 41 connected to the machine from the craft 42.

This craft 42 also has pumping means 43 thereon to pick up sea water and pump it down the hose 44 to be jetted from the trenching machine jets 45 to dig the trench 46 into which the pipe settles behind the machine 39. As the jetting of water generally stirs up the loose bottom of the floor, it happens that the sediment and earth thus stirred up, will settle back over the pipe line in the trench to bury it. The operation and construction of the trenching machine are more particularly described in Reissue Patent No. 23,963.

The pipe 40 employed, as shown in Fig. 5, is generally coated by a material, as bitumen 48, and is also wrapped by a material as felt, wrapping paper, or a suitable water proof material 46'. For this reason the rack members 2 should preferably have the pads 47 thereon to protect the coating from indentations in handling. For the same reason the launchway roller elements 51 of the rollers 5 are of a soft material, preferably rubber.

The individual portable rollers 5 may be put down to direct a launchway along any directional line or at a desired curvature. Such a roller has the base 52 which has the uprights 53 on opposed sides thereof. Centrally on the base 52 between the uprights, there is affixed the wedge member 54, the sides 55 of which have bores 56 therein; these bores are adapted to furnish the journals for the shafts 57 on which the rubber roller elements 51 are affixed to rotate with these shafts.

The upper ends of the shafts are journalled in the bearing members 58, which may be adjustably positioned on the uprights 53. Such adjustment may be obviously accomplished, as by providing a conventional ball bearing unit, not shown, which may be mounted in a conventional ball and socket joint, also not shown, such a construction being installed at either the wedge end or the bearing member end of each shaft.

The floats 6 and 27 have as their buoyant element the water tight barrels 60. These barrels are installed on top of the pipe 40 by means of the encircling straps or bands 61 which extend around the pipe and a side of the barrel, and then pass through the band clipper 65 for connection, by conventional means, with the band portion around the other side of the barrel, the band clipper serving as will later be described for subsequent operation as a strap disconnecting mechanism.

The band disconnecting device or clipper 65 has a base 66 which is preferably curved in one direction to conform with the curvature of the barrel. A block 67 is connected centrally of the base 66 and has the bore 68 therethrough transversely of the curvature of the base. The base 66 and block 67 together constitute the band clipper housing 70. The housing has the opposed slots 71 and 72 through the walls thereof and parallel to, and on substantially the same horizontal plane, as the bore axis.

Figure 9:
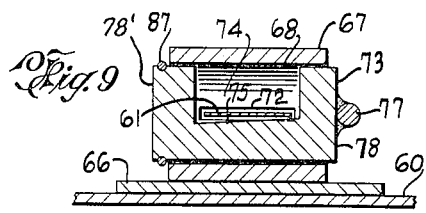
Fig. 9 is a sectional elevation taken along line 9—9 of Fig. 8.
Figure 10:
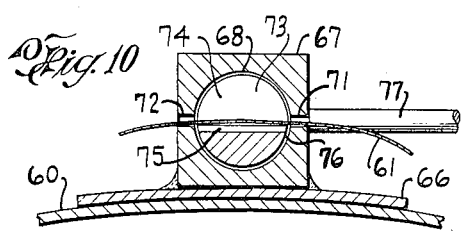
Fig. 10 is a sectional elevation taken along line 10—10 of Fig. 8.

A cylinder 73 is provided to fit within the bore 68, such cylinder being cut away centrally at 74, as shown in Fig. 9, for a length slightly greater than the length of the slots 71. The cut away section 74 extends below the horizontal plane of the bore axis, and terminates in a surface 75, tapered axially to provide a sloped shearing edge 76 for positively shearing the band 61 when the lever 77, connected to the cylinder end 78 transversely of the cylinder axis, is pulled upwardly. The opposite cylinder end 78' has the retaining ring 87 thereon to hold the cylinder 73 in place on the block 67.

Each lever 77 has the curved end 79 into which a line 80 may be tied. These lines 80 join a common line 81 which is connected to a float block 82, of wood or similar buoyant material. The line 81 is of a pre-determined length, dependent upon the fathomed depth of water, so that the block 82 will float on the surface when the pipe 40 is submerged.

Figure 7B:
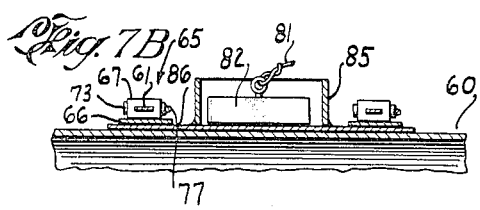
Fig. 7B is a fragmentary sectional elevation showing a second modification of a structure for maintaining a float block on a float barrel until the block floats on the water.

To maintain the float block 82 on top of the barrel 60 until it floats thereabove, and thereby prevent it from interfering with the launching operation by dangling beside the barrel, various means may be employed. As shown in Fig. 7A, a lug 83 may be welded onto the barrel 60 to fit within a hole 84 in the float block. Optionally, a receptacle 85 may be provided, which has an arm 86 extending on either side thereof to be held beneath a clipper 65 as shown in Fig. 7B.

Whereas the launchway 4, comprised of a plurality of roller units 5, provides the most flexible type of launchway and one which is easily transported from point to point, this invention also considers a more permanent launchway as shown in Fig. 11, but which yet is less expensive and elaborate than any conventional side launching structures heretofore employed.

Such launchway 125 comprises cross-ties 126 upon which two parallel extending, spaced apart runways 127 are mounted. Dollies are provided to receive the pipe section 3 thereon, each dolly comprising a base 129 having a guide block 130 connected centrally thereto to extend below into the space between runways 127 to guide the dolly. The transverse members 131 support thereabove the longitudinal members 132, and together these members support a pad 133 to protect the coated pipe section 3.

To launch pipe sections 3 on a launchway 125 it is usually necessary to grease the runways 127, as with crushed bananas, to lessen the frictional contact between dollies and the runway top surfaces 134. It is also often found necessary to weight the pipe sections 3 with weights, as 135, to insure that it moves down the launchway. A noticeable feature of this type of launchway comprises the fact that the dollies are floatable and therefore recoverable from the water after launching.

Optionally, a type of dolly not shown in the drawing may comprise dollies having pads 133 mounted on conventional bases, and supported by wheels which roll upon the runways 127, there being guide blocks 130 provided beneath the bases to maintain the dollies on the runways.

As a feature of this invention it is pointed out that each pair of band clippers 65 and the lines and blocks connected thereto may be recovered. It is simply necessary to direct a craft along a pipe section to be sunk, and an operator therein has only to lift up on the block 82 to transmit operating force through the pull line 81 to the lever mechanism 77 of each band releasing clipper 65 to sever or disconnect the banding strap 61. Upon band release, the entire band clipper and float block assembly may then be lifted into the craft and retrieved for future use. The barrels 60 are also easily retrieved as they can be grappled and brought aboard the craft as soon as they rise to the surface after the severing of the bands 61.

In addition to the means hereinabove described for maintaining the float blocks 82 on top of the barrels 60, a device 190 may be provided comprising a lath strip 191 having two nails 192 therein spaced apart a distance just greater than the length of the block. The line 81 is then wound lightly around the two nails 192 and the block. The ends of the lath are confined in assembly beneath the bases 66 of the band clippers 65.

An optional device of the same type includes a cross piece 193 also having nails 192 therein, and spaced apart a distance just greater than the width of the block 82. This device insures that the block 82 is not bound by the line 81 so that it readily floats when the barrel 60 is submerged therebelow in the water.

It is obvious that the same or similar types of equipment may be employed to remove a pipe line from beneath a body of water. In such case the trenching machine is first employed to loosen the formation thereabout and uncover the pipe. Then, with the line free and plugged at the end remote from the point to which it is to be returned, it is lifted at a point therefrom the length of a section to be floated. It is then severed above water and plugged and the line is allowed to sink to the bottom, a suitable marker being provided to float thereabove to locate the plugged end.

The section to be floated, now free and plugged at both ends, is supported from the surface, first at one end, until barrels can be installed a distance therealong. It may then be supported from the surface at successive points until finally enough barrels have been installed thereon to float the section so that it may be towed to the shore. The launchway provided for launching may then be employed to guide the section inboard. The barrels may be removed from the section ashore or on the water in the vicinity of the shore line. From the launchway, the section may be handled onto the rack. These steps are repeated until all the pipe line is ashore.

This invention broadly sets out to provide more efficient methods for extending pipe lines, usually consisting of processed or coated pipe sections, to off-shore locations and over bodies of water, and for entrenching such pipe lines in the floor beneath the body of water. The system of apparatus and various devices disclosed are within the scope of this invention, as are other structures which can carry out the methods disclosed.

Broadly, therefore, this invention considers both method and structure for launching pipe into the water substantially transversely of the shore line, to travel thereinto in a generally axially extending direction, and it considers therefor a launchway of portable units, and also a more permanent, yet portable launchway, constructed as an integral unit, and providing runways and recoverable dollies. It also considers the adaptation of nautical vessels for welding together pipe sections at sea. Additionally, it considers a method of floating pipe lines, and float means and easily operable float severing means, both of which means are recoverable. It also considers an easily installed and removed trenching machine, inexpensively operated, to entrench the pipe line on the floor beneath a body of water.

This invention also broadly includes the use of the apparatus for extending pipe lines in a method of recovering extended pipe lines from below the bodies of water.

What is claimed is:

1. A method of floating, and then releasing an element, comprising the steps of attaching floats to the element in spaced apart relation along the length thereof by means of extending bands around the element and the floats and through band clippers on the floats, connecting the ends of the bands, moving the element on the water to a predetermined position as the floats buoyantly support the element, and then actuating the band clippers to sever the bands and thereby free the floats and release the element therefrom.

2. For installing a submarine pipe line on the floor of a body of water, float means for rendering the pipe line buoyant for maneuvering the same to position, a band extending around said float means and said pipe line to hold them as a floating assembly, a band clipper through which said band extends to hold the same as a part of the floating assembly, additional float means separately floatable on the surface of said body of water and tie connection means between said additional float means and the band clipper of a length that said additional float means floats on the surface independently of said floating assembly and in spaced relation to said band clipper and is accessible in such spaced apart relation for the transmission through said tie connection means of an operating pull on the band clipper for severing said holding band and thereby free the first mentioned float means from said pipe line and permit the latter to sink to the floor.

3. The method of laying conduit beneath a body of water, including joining conduit sections in end-to-end succession at a work station, paying out into the body of water the conduit as it grows in length by the joining of additional sections at the work station, strapping a float by a banding strap to the conduit at each of spaced intervals along its length of pay-out and passing the strap through a starp-severing device carried by the float and affixed to a force transmitting line terminating in a marker buoy, guiding the lead end of the floated conduit as the conduit is being payed out until the conduit has grown to the desired length and is properly positioned, and then locating the buoy-marked force transmitting line and applying therethrough an actuating force to the strap-severing devices to free the several floats and sink the sectionally-joined conduit.

4. The method of laying conduit under a stretch of water, including joining conduit sections in end-to-end succession at a work station and feeding the conduit forward into the water as succeeding sections are joined thereto, securing pontoons by banding straps to the conduit at spaced intervals while at the work station with the banding strap fitted at each pontoon to a severing device whose actuator includes a buoyant element capable of floating on the water's surface, guiding the pontoon-floated, sectionally-joined conduit to final destination, and then picking up said buoyant elements and actuating the severing devices to release the banding and allow the conduit to sink.

5. Means to lay a conduit under a stretch of water, including a work station having mechanism to position conduit sections while they are joined in end-to-end succession and to feed the joined sections forward into the water, a plurality of conduit-supporting floats strapped to the conduit at spaced intervals along its length, means to guide the floating conduit as it is fed forward to its final position, a strap-severing device located at each float, and an actuator for said device including a buoyant element floatable on the water surface independently of said float and having a force transmitting connection with said device by which a strap severing operation may be effected to release the conduit from support by said floats.

6. A method of installing a submarine conduit on the floor of a body of water, including securing a series of pontoons by connecting straps to the conduit at spaced intervals along its length to suspend the conduit below the surface and above its ultimate ground of rest on the floor, installing at each pontoon a force-responsive strap-disconnecting mechanism, placing the conduit in the water in submerged relation at the ultimate location, and then transmitting from the surface an operating force to the strap-disconnecting mechanism and thereby freeing the pontoons and allowing the sinking of the conduit.

7. For installing a submarine conduit on the floor of a body of water, a series of pontoons suspending the conduit above the floor and below the water surface, conduit and pontoon-encircling bands connecting the pontoons with the conduit at spaced intervals along the length of the conduit, band-disconnecting devices arranged for co-operation with the several bands in effecting disconnection of the encircling band connections of the conduit and said pontoons and work performing connections with said devices operable to transmit force thereto in the performance of the band disconnecting operation, said work performing connections being of a length extending to a force applying location remote from the devices and above the pontoon suspended conduit.

8. For installing a submarine conduit on the floor of a body of water, a series of pontoons suspending the conduit above the floor and below the water surface, conduit and pontoon-encircling bands connecting the pontoons with the conduit at spaced intervals along the length of the conduit, band-disconnection devices secured in operating relation with the bands respectively, force-responsive mechanism for operating said band-disconnection devices, and force-transmitting means operable at surface level to effect the operation of said mechanism.

References Cited in the file of this patent

UNITED STATES PATENTS

| | | |
|---|---|---|
| 131,322 | Anderson | Sept. 17, 1872 |
| 375,464 | Thacher et al. | Dec. 27, 1887 |
| 403,865 | Ward | May 21, 1889 |
| 485,983 | Powell | Nov. 8, 1892 |
| 612,485 | Conover | Oct. 18, 1898 |
| 650,134 | Phillips | May 22, 1900 |
| 670,778 | Guthrie | Mar. 26, 1901 |
| 1,852,796 | Bennett | Apr. 5, 1932 |

OTHER REFERENCES

Engineering News-Record of Nov. 10, 1932, pages 562–563.

The Petroleum Engineer of April 1933, pages 16–17.